United States Patent [19]
Sihon

[11] 3,865,087
[45] Feb. 11, 1975

[54] DIESEL ENGINE AND CYLINDER HEAD THEREFOR

[75] Inventor: Tanas M. Sihon, Ypsilanti, Mich.

[73] Assignee: General Motors Corporation, Detroit, Mich.

[22] Filed: June 5, 1974

[21] Appl. No.: 476,579

[52] U.S. Cl............ 123/65 VC, 123/29, 123/41.73, 123/41.77, 123/41.85, 123/59 BL, 123/70 V, 123/188 M
[51] Int. Cl....................... F02b 75/02, F02d 39/04
[58] Field of Search....... 123/65 VC, 59 BA, 59 BL, 123/32 J, 29, 70 V, 191 R, 188 M, 41.73, 41.77, 41.85

[56] References Cited
UNITED STATES PATENTS

| | | | |
|---|---|---|---|
| 3,020,896 | 2/1962 | Meurer | 123/188 M |
| 3,054,390 | 9/1962 | Meurer | 123/188 M |
| 3,074,389 | 1/1963 | Lilly | 123/41.77 |
| 3,161,182 | 12/1964 | Albinson | 123/65 VC |
| 3,491,731 | 1/1970 | Dinger | 123/191 R |
| 3,590,789 | 7/1971 | Wiebicke | 123/188 M |

*Primary Examiner*—Manuel A. Antonakas
*Assistant Examiner*—Daniel J. O'Connor
*Attorney, Agent, or Firm*—Robert J. Outland

[57] ABSTRACT

A two-stroke cycle uniflow diesel engine having large closely spaced cylinders includes a novel trapezoidal valve arrangement providing improved gas flow while meeting limitations of components common with another engine line and cooling system improvements including an improved flow director tube and sealing arrangement providing adequate cooling flow between the cylinders in a reduced space dictated by the larger cylinders.

3 Claims, 10 Drawing Figures

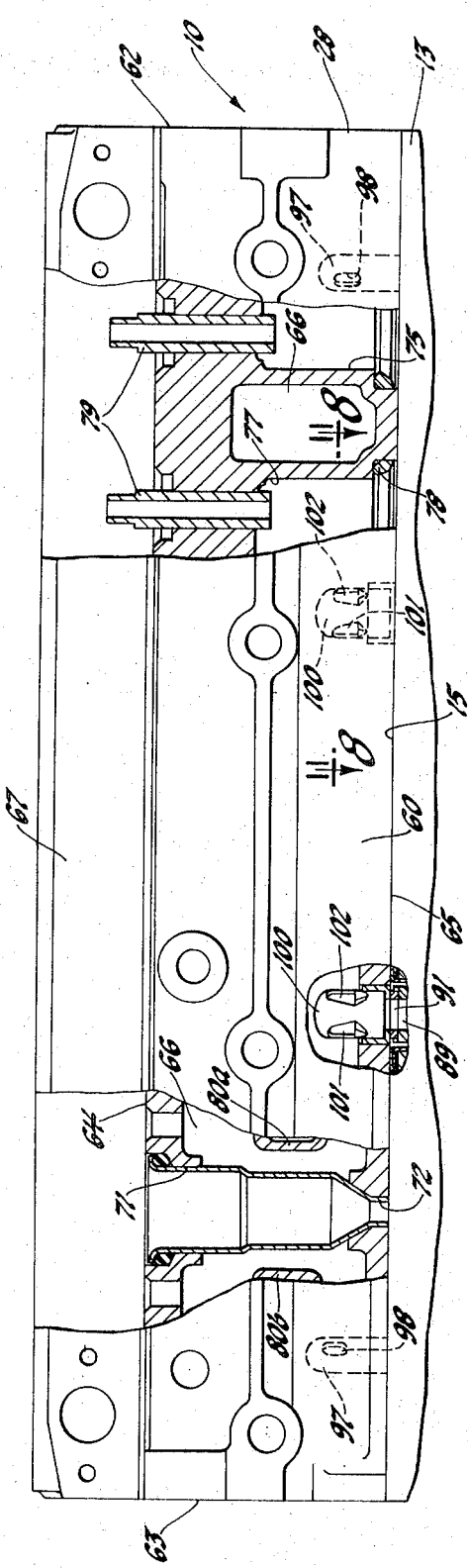
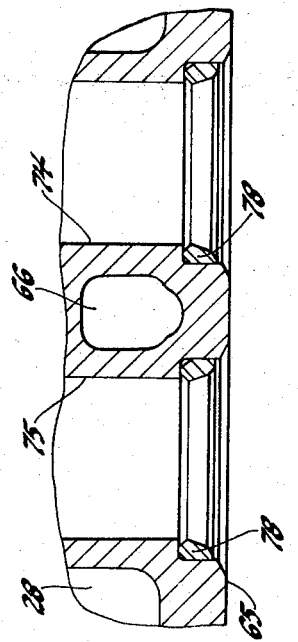
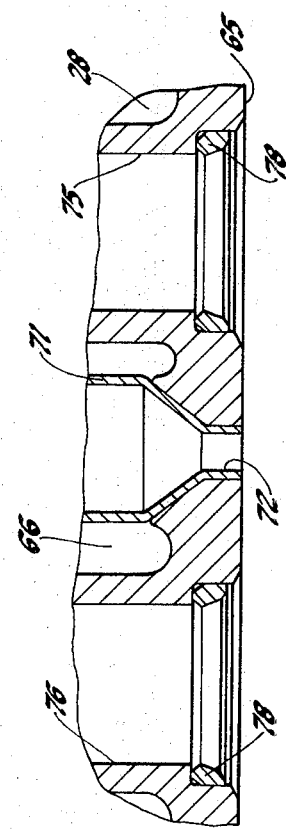
Fig. 3
Fig. 5
Fig. 4

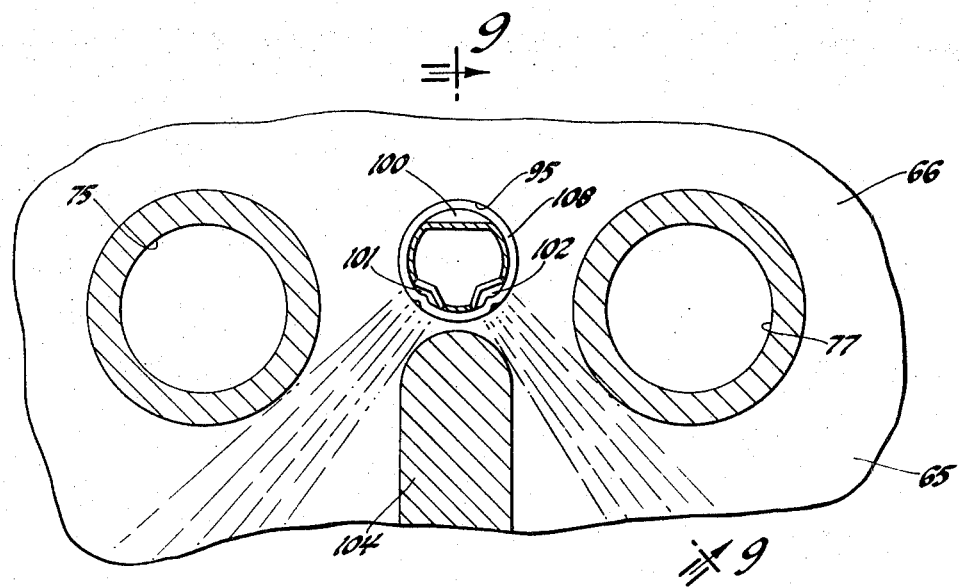
Fig. 8
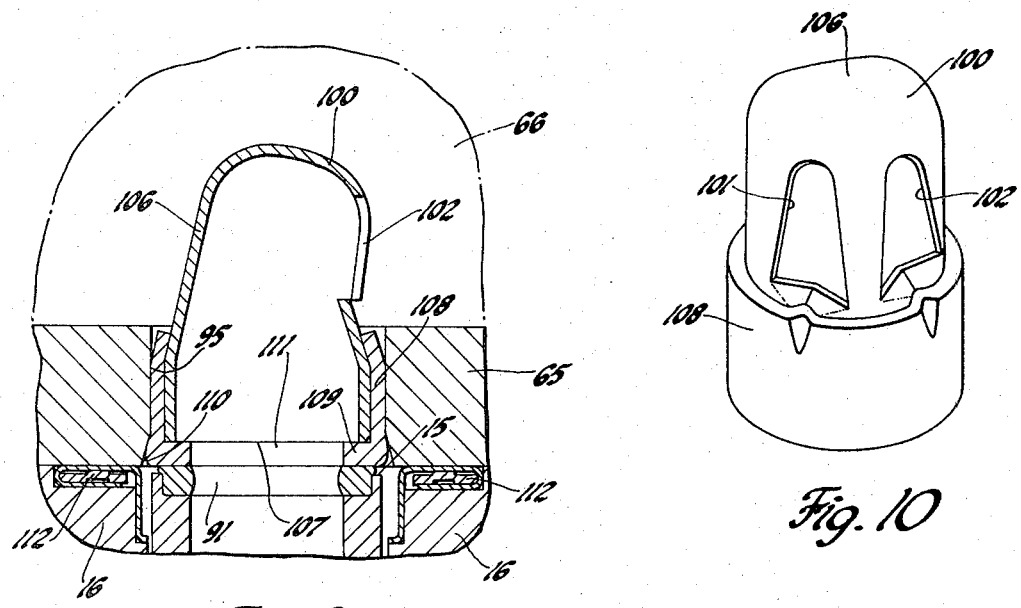
Fig. 9
Fig. 10

DIESEL ENGINE AND CYLINDER HEAD THEREFOR

FIELD OF THE INVENTION

This invention relates to internal combustion engines and more particularly to improvements in valve arrangements and cooling system features in the cylinder heads and block of a line of two-cycle uniflow scavenged diesel engines.

BACKGROUND OF THE INVENTION

The design of a new line of engines incorporating larger cylinder bores for increased displacement and power output while utilizing in common with a previous engine line identical cylinder spacings and numerous machining locations, as well as maintaining interchangeability of numerous engine components, facilitated the use of the same manufacturing tooling and equipment for building both engine lines, thereby reducing the cost of manufactur of, as well as the ease of changeover to making the larger engine. However, this design change also proposed difficult design challenges in connection with maintaining adequate cooling of the new higher output cylinders within smaller coolant passages resulting from closer cylinder spacing. In addition, the problems of properly locating the valves to obtain the gas flow capacity and efficiency necessary to utilize the increased cylinder size to best advantage while accommodating valve actuating and fuel injection components, in part interchangeable with the earlier engine line introduced significant complications.

SUMMARY OF THE INVENTION

The present invention provides a high output two-stroke cycle uniflow scavenged diesel engine constructed along the lines of the prior basic design of a line of currently manufactured engines, but utilizing new cylinder block, cylinder head and other engine component designs to accommodate larger cylinder bores with an overall engine displacement increase of 30 percent. The larger displacement engine retains identical cylinder centers and utilizes numerous components identical with, or mountable upon identically spaced securing means as, the components of the prior engine line. Such interchangeable component mountings include mountings for the air blower, valve and injector actuating gear, fuel controls, exhaust manifolds and the like.

To permit such interchangeability, a number of novel features are provided in the cooling and exhaust flow systems in particular.

In this regard it is a feature of the invention that the cylinder head provides an injector receiving wall and four trapezoidally spaced exhaust valve ports and exhaust valves for each cylinder location. The exhaust ports connect with a transverse exhaust passage for each cylinder location which is bifurcated to extend around the injector receiving wall. Spacing of the valves and ports near the edges of the enlarged cylinders provides a substantial coolant passage between the exhaust passage and the injector receiving wall and passages between ports, some of which are larger than in the prior engine design so as to permit improved cooling of the injector and valve seats.

A further feature of the invention is that the inner valves, at the ends of the exhaust passages, are spaced closer together than the outer valves, providing clearance for the inner valves from engagement with the rocker arm shaft supports mounted outwardly thereof and the outer valves from engagement with the injector body mounted inwardly thereof. Valve bridges interconnecting the inner and outer valves common to each exhaust leg are angled to accommodate the trapezoidal valve spacing while permitting actuation by valve rocker arms supported on rocker shafts and shaft supports all common to both engine lines.

Another feature of the invention is that novel flow director tubes and sealing arrangements are utilized in the lower cylinder head walls and cylinder block to permit adequate coolant flow between the block and head intermediate the more closely spaced cylinder bores of the larger engine and to direct sufficient coolant around the valve seats and injectors.

These and other features and advantages of the invention will be more fully understood from the following description of a preferred embodiment taken together with the accompanying drawings.

BRIEF DESCRIPTION OF THE DRAWINGS

In the drawings:

FIG. 3 is a view from the plane indicated by the line 3—3 of FIG. 2 showing the inner side of the cylinder head, with portions broken away to show its interior construction and having the injectors, valves and actuating gear removed for clarity;

FIG. 4 is a cross-sectional view of the cylinder head as shown in FIG. 3 taken generally in the plane indicated by the line 4—4 of FIG. 2 and showing the relationships of opposite front and rear exhaust ports and the injector receiving wall for one of the cylinders;

FIG. 5 is a cross-sectional view of the cylinder head as shown in FIG. 3 taken generally in the plane indicated by the line 5—5 of FIG. 2 and showing the relationship of the two front exhaust ports at one of the cylinder locations;

Thus, 6 is a bottom view of one of the cylinder heads from the plane indicated by the line 6—6 of FIG. 1, with one of the valve heads removed to show the valve seat; valves

FIG. 8 is a longitudinal cross-section view from the plane indicated by the line 8—8 of FIG. 3 and showing the inner surface of the cylinder head lower wall indicating the direction of coolant flow from a flow director nozzle to the valve seats of adjacent cylinders;

FIG. 9 is a cross-sectional view from the plane indicated by the line 9—9 of FIG. 8 showing the construction and installation of the flow director nozzle and sealing means therefor; and FIG. 10 is a pictorial view illustrating the construction of one of the flow director nozzles of the type utilized intermediate the cylinders.

DESCRIPTION OF THE PREFERRED EMBODIMENT

Figure 1:
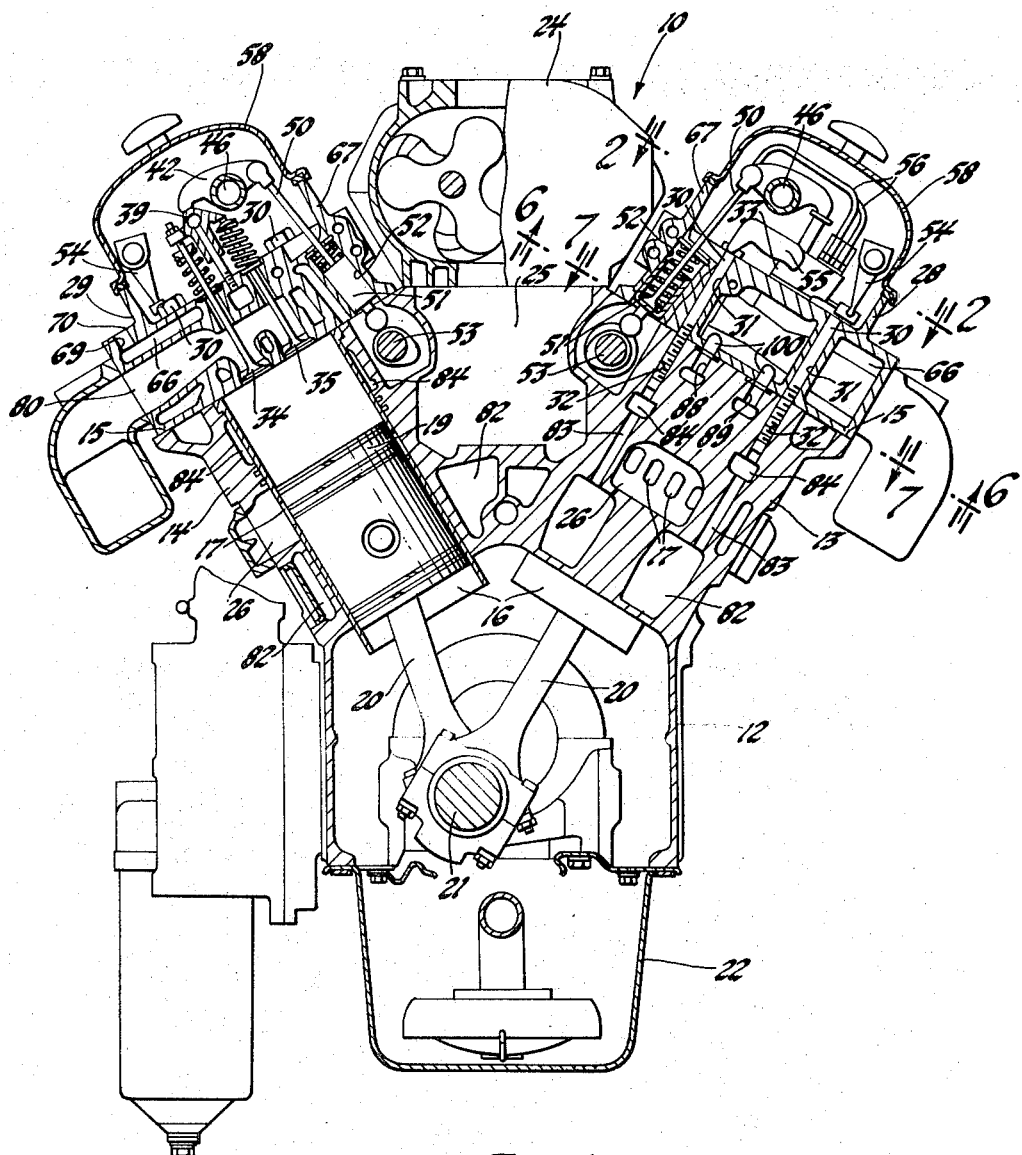
FIG. 1 is a transverse cross-sectional view of a two-cycle diesel engine having V-arranged cylinder banks and including novel features in accordance with the invention.
Figure 2:
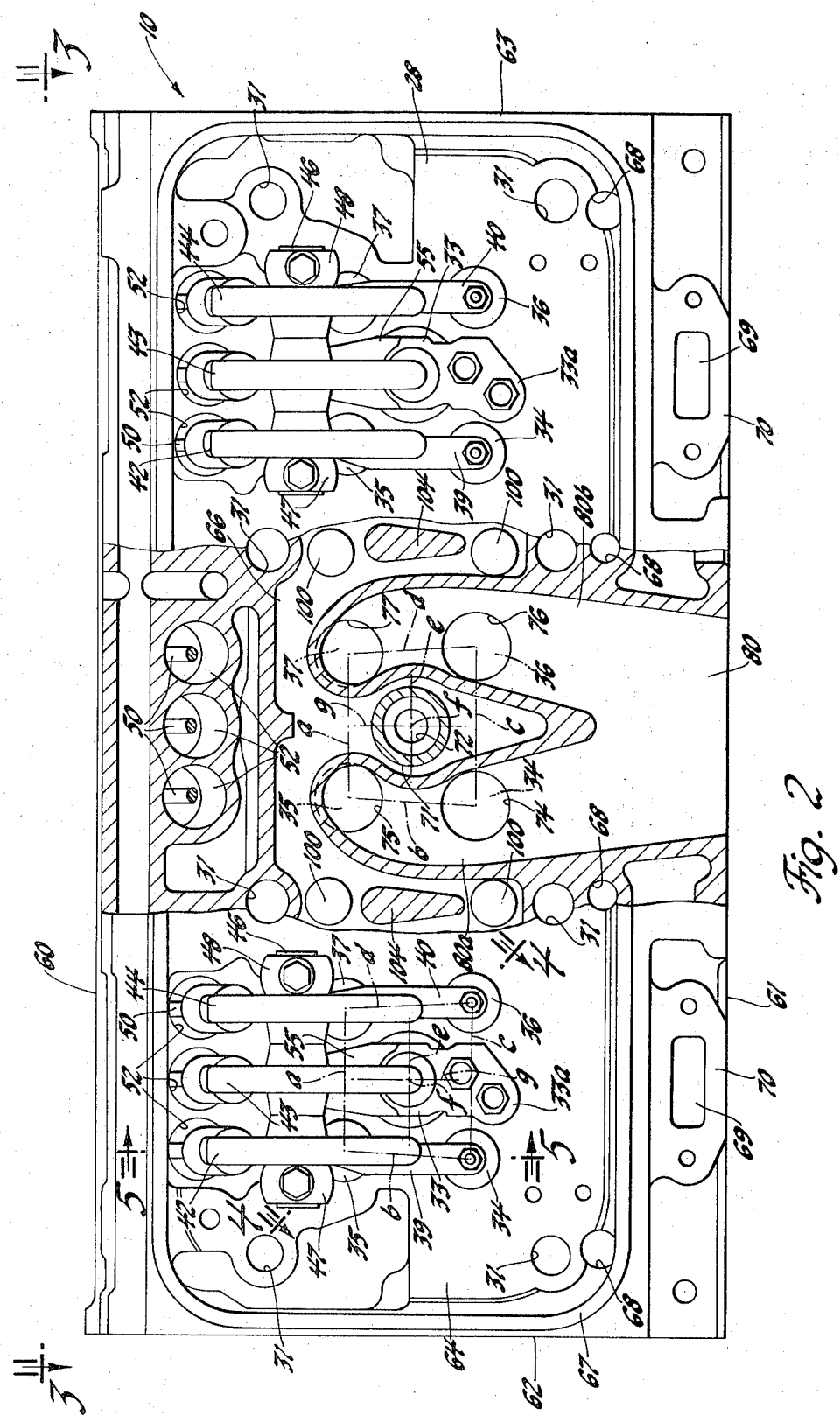
FIG. 2 is a top view of one of the engine cylinder banks with the valve cover removed as viewed generally from the plane indicated by the line 2—2 of FIG. 1, showing the cylinder head assembly with portions of the head broken away to show the internal construction thereof.
Figure 6:
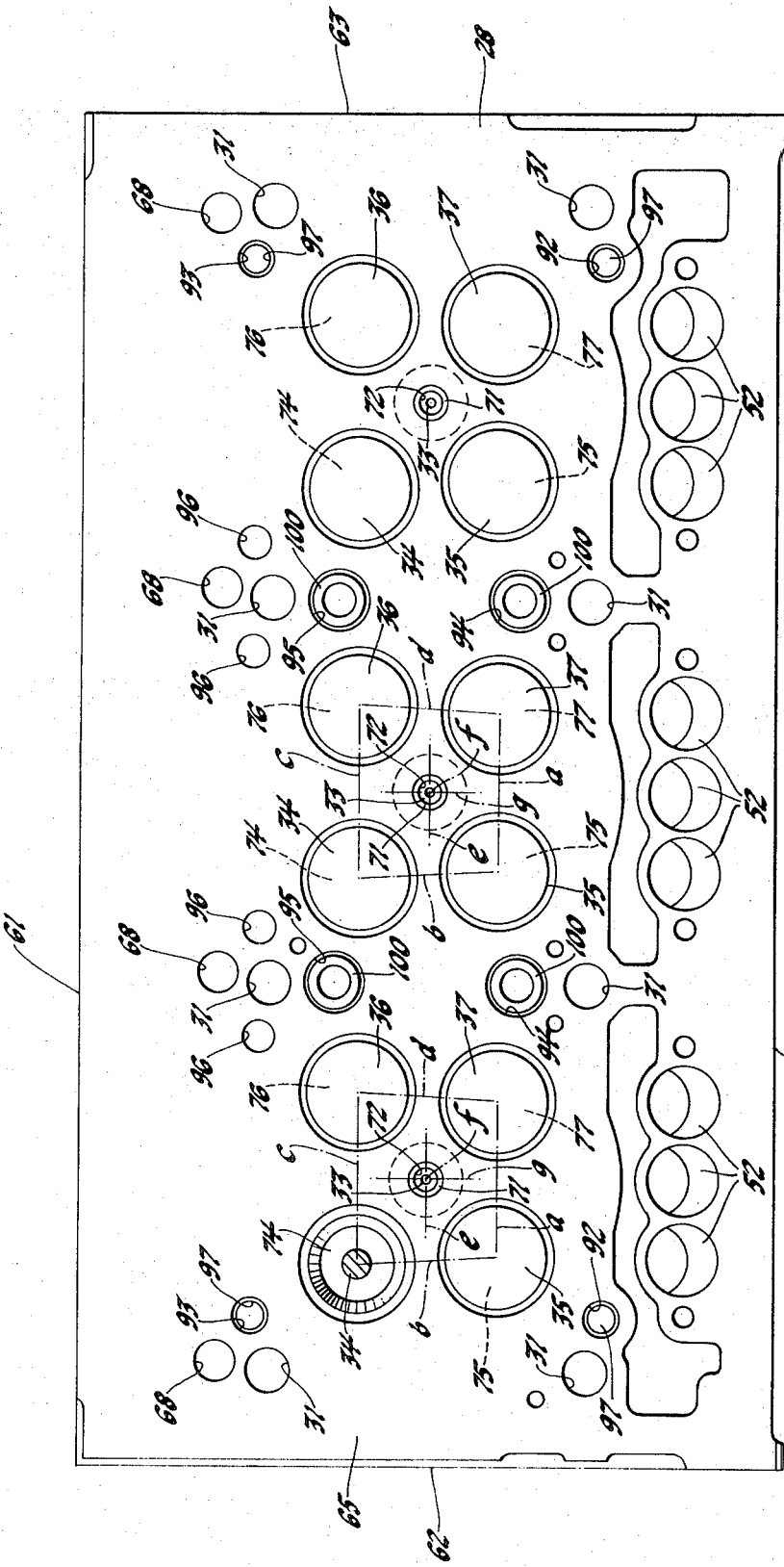
Figure 7:
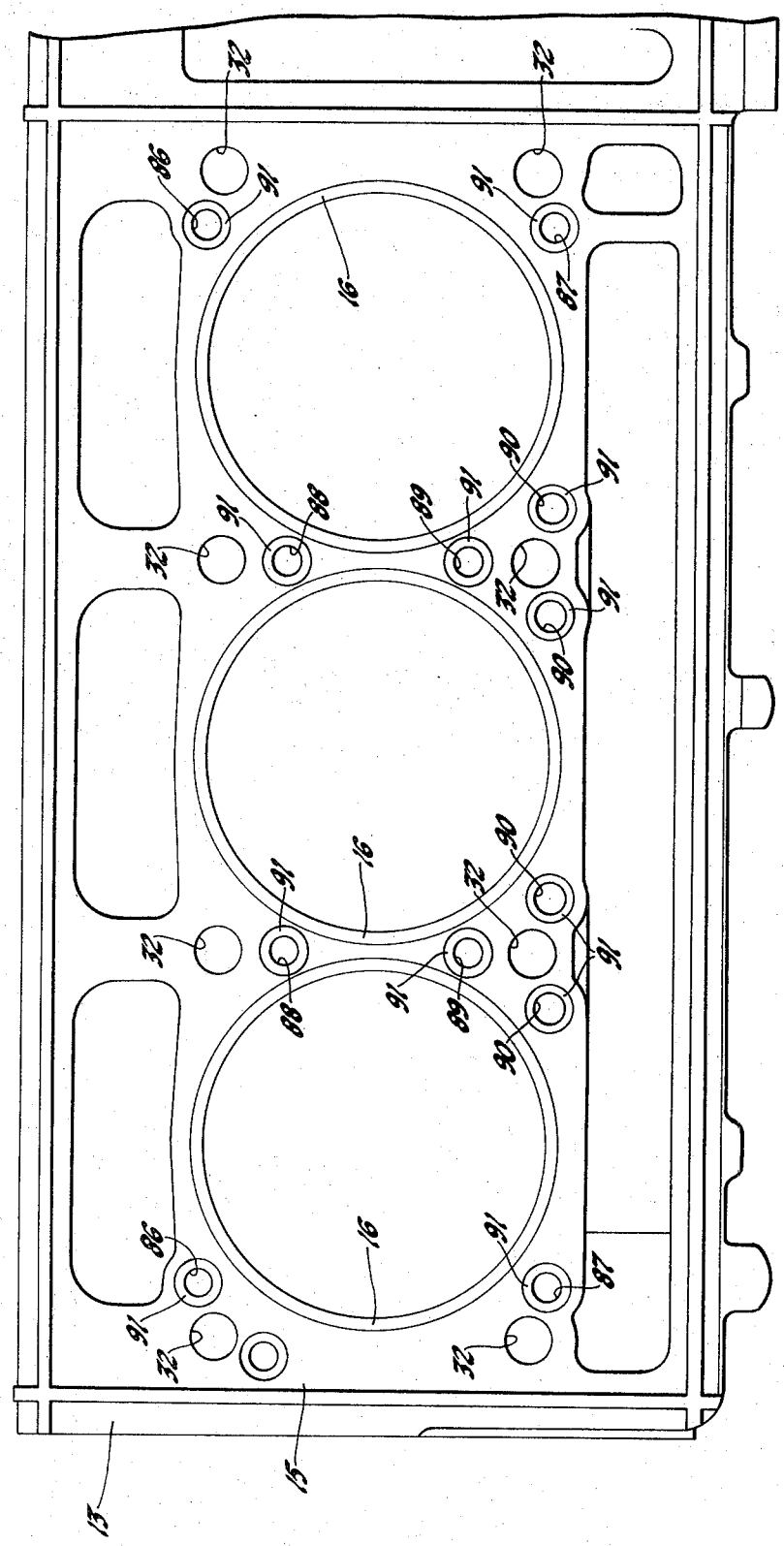
FIG. 7 is a top view of one of the cylinder banks from the plane indicated by the line 7—7 of FIG. 1.

Referring first to FIG. 1 of the drawings, there is shown an internal combustion engine 10 of the two-stroke cycle uniflow scavenged diesel type. Engine 10 includes a cylinder block 12 having a pair of cylinder banks 13, 14 arranged in V configuration. Cylinder banks 13, 14 each contain a plurality of longitudinally aligned openings extending through upper end walls 15 and receiving cylinder defining liners 16. The cylinders 16 are open at their ends and have a plurality of air inlet ports 17 disposed centrally thereof.

Each of the cylinders contains a reciprocably movable piston 19 connected by a connecting rod 20 to a crankshaft 21 journalled in conventional fashion in the lower portion of the cylinder block 12. An oil pan 22 is secured below the block and provides a sump for oil used in lubricating the various parts of the engine.

A Roots type blower 24 is centrally mounted on the top of the block and is driven through connection (not shown) with the crankshaft so as to supply air to a central plenum 25. The plenum forms a portion of an air box 26, extending into the two cylinder banks and connecting with the cylinder inlet ports 17.

A pair of cylinder heads 28, 29 are mounted, one on each of the cylinder banks 13, 14, respectively. The cylinder heads are secured to their respective cylinder banks by means of securing bolts 30 extending through cylinder head and cylinder bank bolt openings 31, 32 respectively.

For each cylinder location, the cylinder heads carry a number of components including a centrally mounted injector 33 having a thickened body portion 33a, four exxhaust valves 34, 35, 36 and 37 and exhaust pair of angled valve bridges 39, 40. Valve bridge 39 actuatingly engages the front pair of valves 34, 35 and bridge 40 engages the rear pair of valves 36, 37 for each cylinder. Also included are three rocker arms 42, 43, 44. Rocker arms 42 and 44 engage the valve bridges 39 and 40, respectively, and rocker arm 43 engages the injector 33. The rocker arms are carried on a rocker shaft 46 provided for each cylinder location, which is in turn supported on a pair of shaft supports 47, 48 secured to the cylinder head. The rocker arms are actuated by push rods 50 connected with spring biased followers 51, carried in openings 52 of their respective cylinder heads and engaging the cams of cylinder block carried cam shafts 53 which are driven by connection (not shown) with the engine crankshaft 21. The cylinder heads also carry fuel injector rack actuating means 54, injector hold down crabs 55 and fuel lines 56, all of which with the valve gear are enclosed by valve covers 58 in conventional fashion.

The construction of each cylinder head as best shown in FIGS. 1–6 of the drawings includes a cast member having inner and outer side walls 60, 61, respectively, front and rear end walls 62, 63, respectively, and upper and lower walls 64, 65, respectively, the lower wall defining a fire deck, closing the ends of the various engine cylinders 16. The walls 60–65 enclose a coolant jacket 66 adapted to receive liquid coolant for cooling the various parts of the engine cylinder head. A raised rim 67 on the upper wall 64 surrounds the valve gear and other components and provides a seat for the respective valve cover 58. Oil drain openings 68, extending through the head, provide for the return of lubricating oil from the enclosed portion of the upper deck to the engine oil sump. Adjacent the rim, a plurality of coolant outlet openings 69 extend through upwardly facing bosses 70 located along the outer edge of the head and adapted to mount a water outlet manifold (not shown). An alternative outlet opening (not shown) may be located at one end of the head.

At each cylinder location, an injector tube 71 is secured in openings in the upper and lower cylinder head walls and defines wall means for receiving an elongated portion of the associated injector 33. The tube 71 is disposed on the axis of its respective cylinder and has a centrally located injector nozzle opening 72. Surrounding the injector tube at each cylinder location are four exhaust ports 74, 75, 76 and 77 which are controlled by exhaust valves 34–37, respectively. The exhaust ports 74–77 open through the lower wall 65 of the cylinder head at valve seat inserts 78 and extend upwardly to connect adjacent valve guides 79 with an exhaust passage 80. The exhaust passage for each cylinder extends laterally through the coolant jacket and opens through the outer side wall 61 of the cylinder head adjacent each cylinder location. Each exhaust passage is bifurcated to provide front and rear legs 80a, 80b, respectively, which pass in spaced relation around the injector tube 71. The front leg 80a of each exhaust passage connects with ports 74 and 75, ending at the latter, while the rear leg 80b connects with ports 76 and 77, also ending at the latter.

The positions of the ports, relative to the side and end walls of the cylinder heads, permit identification of the various pairs of ports as front 74, 75 and rear 76, 77 or inner 75, 77 and outer 74, 76. The axes of the four ports for each cylinder location form the corners of a trapezoid $a, b, c, d$, having inner and outer sides $a, c$, respectively, equally spaced on opposite sides of the longitudinal plane $e$ through the axis $f$ of the injector opening. The front and rear sides $b, d$, respectively, of the trapezoid are angled outwardly, since the inner ports 75, 77 are located closer to the lateral plane g through the axis f of the injector opening than are the outer ports 74, 76. For this reason, the valve bridges 39, 40 are angled outwardly as they contact the front and rear pairs of valves, respectively.

The trapezoidal arrangement of the ports resulted from moving the valve locations outwardly to the extent permitted by the use of larger valves within the larger cylinder bores of the improved engine. The wider spacing of the valves permits larger coolant passages between the inner and outer exhaust ports and maintains a substantial coolant passage between the legs of each exhaust passage and the injector wall it encircles, thus providing the capability for improved coolant flow and better cooling of the injector and valve seats. FIG. 4 shows the coolant passage provided between the injector tube and adjacent valve seats. Note that the passage is larger adjacent the outer exhaust port 76 due to the greater longitudinal spacing of the outer ports. The increased spacing of the inner valve ports 75, 77 was provided by moving the ports laterally toward the head inner wall 60. In this position, the upper ends of the valves with their caps and springs extend between the rocker shaft supports with a clearance sufficiently close that longitudianl outward movement of these valves and ports would not be permitted. On the other hand, the outer ports 74, 76 were moved outwardly by both lateral and longitudinal outward movement. The longitudinal adjustment was required to permit sufficient spacing of valve 34 from the thickened body portion 33a of the injector 33 which extends to a close clearance relationship with the valve cap and spring.

Thus, the trapezoidal valve arrangement gives the desired advantages of better air flow through the use of larger valves and improved coolant flow around the injector and valve seats by provision of larger passages while at the same time avoiding interference of the inner valves with the rocker shaft supports and of the outer valves with the injector body. The exhaust passage connecting with the trapezoidally arranged ports is also designed with smooth flow curves to the extent possible to provide for increased gas flow with better flow efficiency for improved engine breathing.

The engine cooling arrangement will now be described. In the cylinder block, coolant is supplied from a coolant pump, not shown, to a lower jacket 82 surrounding the lower portions of the cylinder liners below the air inlet ports. From the lower jacket the water passes upwardly through drilled passages 83 to upper water jackets 84, surrounding and in contact with the upper portions of the liners above the air inlet ports. From the upper jacket 84 the coolant passes out the upper end walls 15 of the cylinder banks through a plurality of coolant openings including inner and outer end openings 86, 87, respectively, located between the end cylinders and their respective ends of the cylinder block, inner and outer intermediate openings 88, 89, respectively, located between adjacent engine cylinders and supplemental outer openings 90 located adjacent the head bolt openings 32 disposed outwardly of coolant openings 89. Each of these openings is counterbored from the surface of its end wall 15 to receive a resilient seal ring 91.

Each cylinder head includes aligned coolant openings through its lower wall 65 and mating with the openings 86-90 in the end walls 15 of the cylinder banks. The cylinder head coolant openings include inner and outer end openings 92 and 93, respectively, inner and outer intermediate openings 94 and 95, respectively, and supplemental outer openings 96. These openings all connect with the cylinder head coolant jacket 66 at locations adjacent the walls of the various exhaust ports.

The end coolant openings 92 and 93 of the cylinder head have diameters approximately equal to the inner diameter of the seal rings 91 and are provided with small single-piece cup-shaped flow director nozzles 97 of a type utilized in the previous engine design. These nozzles are pressed into the coolant openings and have open ends disposed adjacent the outer surface of the cylinder head lower wall. A closed end portion of each nozzle protrudes within the cylinder head water jacket and includes a side nozzle opening 98 that directs coolant entering the nozzle from the engine block laterally inwardly along the floor of the coolant jacket and against the adjacent valve ports. At these end locations the seal rings 91 engage directly the surface of the cylinder lower wall to seal the joint between the head and block coolant passages against leakage. The supplemental openings 96 of the cylinder head have no flow director nozzles and the block to head joint is also sealed by engagement of the seal rings 91 with the lower wall surface.

As best shown in FIGS. 8-10, the intermediate cylinder head openings 94, 95 are formed slightly larger in diameter than the outer diameter of the seal rings 90. Dual opening flow director nozzles 100 of novel two-piece construction are press-fitted into each of these intermediate openings with their dual nozzle openings 101, 102 arranged to direct water flow between the valve ports of the adjacent cylinder locations and vertical support ribs 104 in the cylinder head.

In the preferred embodiment, the nozzles 100 are each formed of two pieces. One is a deep-drawn cup-shaped member 106 made of thin copper sheet for ease of formability and having the two orifices 101, 102 therein, the member being open at one end 107. A relatively thicker copper sleeve member 108, having a radially inwardly extending flange 109, is fitted over the open end of the cup member and crimped securely in place thereon. In assembly, the sleeve members are received within the head intermediate openings 94, 95 where they are tightly press-fitted, the metal being sufficiently heavy to form a leak proof joint and positively retain the nozzle by upsetting into a chamfer 100 adjacent the surface of the head lower wall 65. The outer end of the flanged portion 109 of the sleeve member is made flush with the surface of the cylinder head lower wall and, in assembly, is engaged by its associated seal ring 91. An opening 111 formed within the flanged portion has a diameter approximately equal to the inner diameter of the seal ring and the corresponding intermediate passages 88, 89 of the cylinder block.

The two-piece construction of the intermediate flow director nozzles 100 makes possible the forming of the deep cup-shaped member while providing a heavy section and a flanged end, required to positively seat the nozzle in a fixed leak-tight position for sealing engagement by the seal ring. This arrangement wherein the seal ring engages the end of the flow director nozzle, rather than the cylinder head surface around the nozzle, provides a maximum coolant flow area in a compact construction that fits between the more closely spaced cylinder bores of the larger engine. As can be seen in FIG. 9, the seal ring supporting counterbore is positioned very near the openings in which the cylinder liners 16 are located. Compression gaskets 112 are disposed between the ends of the cylinder liners and the lower wall 65 of the cylinder head for sealing the combustion gases therein.

In operation the flow director nozzles 100 for the intermediate openings direct coolant between the valve seats and underneath the exhaust passages, some of the coolant passing into the coolant passage between the exhaust passages and injector wall and thence upwardly cooling the injector and exhaust passage walls. Coolant passing through the end flow director nozzles 97 is similarly directed inwardly along the valve seats and exhaust passages. After scrubbing the lower wall, the coolant moves upwardly in the cylinder head jacket and exits through the outlet openings 69 provided at the outer edge of the cylinder head top wall and thence to the water outlet manifold (not shown).

While the invention has been described by reference to a specific embodiment, it should be understood that numerous changes could be made within the scope of the inventive concepts described and, accordingly, the invention is not intended to be limited except by the language of the following claims.

What is claimed is:
1. An internal combustion engine comprising
a cylinder block having a top wall and a plurality of longitudinally aligned closely spaced cylinders,
a cylinder head having lower and side walls, said cylinder head being mounted with said lower wall sealingly opposing the top wall of said block so as to close the ends of said cylinders,
a plurality of injectors, one for each cylinder location, carried in said head and centered in their respective cylinder axes, said injectors each having a body portion including a thickened outer part intermediate the outer valves of each cylinder location,
a plurality of exhaust passages extending laterally within said cylinder head, and opening through one of said side walls, said exhaust passages connecting at each cylinder location with four exhaust ports opening through said lower wall at locations spaced around the respective injector opening for said cylinder location, said exhaust passages being bifurcated with separate legs extending on opposite sides of said injector opening, one of said legs connecting with the two exhaust ports to the rear of said cylinder location and the ohter of said legs connecting with the two exhaust ports to the front of each cylinder location, one of the ports connecting with each leg comprising an inner port disposed at the end of its respective exhaust leg and the other of said ports comprising an outer port disposed closer to the side wall outlet of its exhaust passage than said inner port,
a plurality of exhaust valves reciprocably carried in said cylinder head and closing said exhaust ports, said valves being openable to permit exhaust flow from said cylinders to said exhaust passages,
valve and injector actuating means including a plurality of rocker arms for each cylinder location,
means supporting said rocker arms, said support means being secured to said cylinder head and extending beside the locations of the inner valves of their respective cylinder locations,
said exhaust ports and their respective valves being arranged in trapezoidal fashion with the inner and outer valves being laterally equally spaced from the axis of said cylinder and injector tube but with the inner ports and valves being longitudinally spaced closer to the axis of said cylinder and injector tube than are the outer ports and valves whereby the inner valves avoid interference with said rocker arm support means and the outer valves avoid interference with said injector body thickened portion.

2. An internal combustion engine comprising
a cylinder block having a top wall and a plurality of longitudinally aligned closely spaced cylinders opening through said top wall, said block defining a coolant jacket surrounding said cylinders and having a plurality of coolant openings through said top wall intermediate said cylinders and connecting with said coolant jacket,
a cylinder head having lower and side walls and defining an internal coolant jacket, said cylinder head being mounted with said lower wall sealingly opposing the top wall of said block so as to close the ends of said cylinders, said head having coolant openings through the lower wall and connecting the head coolant jacket with the block coolant openings to permit the passage of coolant from said block coolant jacket to said head coolant jacket,
an injector receiving wall in said cylinder head at each cylinder location and defining an opening through said head for receiving a fuel injector, said injector opening extending through said lower wall and centered on the axis of its respective cylinder,
a plurality of exhaust passages extending laterally within said cylinder head coolant jacket and opening through one of said side walls, said exhaust passages connecting at each cylinder location with four exhaust ports opening through said lower wall at locations spaced around the respective injector opening for said cylinder location, said exhaust passages being bifurcated with separate legs extending on opposite sides of said injector opening, one of said legs connecting with the two exhaust ports to the rear of said cylinder location and the other of said legs connecting with the two exhaust ports to the front of each cylinder location, one of the ports connecting with each leg comprising an inner port disposed at the end of its respective exhaust leg and the other of said ports comprising an outer port disposed closer to the side wall outlet of its exhaust passage than said inner port,
a plurality of exhaust valves reciprocably carried in said cylinder head and closing said exhaust ports, said valves being openable to permit exhaust flow from said cylinders to said exhaust passages,
a plurality of injectors, one for each cylinder location and received in the respective injector openings of said head, said injectors each having a body portion including a thickened outer part intermediate the outer valves of each cylinder location,
valve and injector actuating means including a plurality of rocker arms for each cylinder location,
means supporting said rocker arms, said support means being secured to said cylinder head and extending beside the locations of the inner valves of their respective cylinder locations,
said exhaust ports and their respective valves being arranged in trapezoidal fashion with the inner and outer valves being laterally equally spaced from the axis of said cylinder and injector tube but with the inner ports and valves being longitudinally spaced closer to the axis of said cylinder and injector tube than are the outer ports and valves whereby the inner valves avoid interference with said rocker arm support means and the outer valves avoid interference with said injector body thickened portion while providing a substantial clearance space between said exhaust ports and said injector tube wall for coolant flow therebetween.

3. An internal combustion engine comprising
a cylinder block having a top wall and a plurality of longitudinally aligned closely spaced cylinders opening through said top wall, said block defining a coolant jacket surrounding said cylinders and having a plurality of coolant openings through said top wall intermediate said cylinders and connecting with said coolant jacket,
a cylinder head having lower and side walls and defining an internal coolant jacket, said cylinder head being mounted with said lower wall sealingly opposing the top wall of said block so as to close the ends of said cylinders, said head having coolant openings through the lower wall and connecting with the head coolant jacket and the block coolant openings to permit the passage of coolant from said block coolant jacket to said head coolant jacket, a plurality of flow director nozzles, each nozzle comprising a cup-shaped member having at least one nozzle opening in the side thereof and an open end, said flow director nozzles being installed one in each of said head coolant openings such that said open end is at the surface of said lower wall and said nozzle opening is within said coolant jacket and arranged to direct water flow laterally therein, an injector receiving wall in said cylinder head at each cylinder location and defining an opening through said head for receiving a fuel injector, said injector opening extending through said lower wall and centered on the axis of its respective cylinder, a plurality of exhaust passages extending laterally within said cylinder head coolant jacket and opening through one of said side walls, said exhaust passages connecting at each cylinder location with four exhaust ports opening through said lower wall at locations spaced around the respective injector opening for said cylinder location, said exhaust passages being bifurcated, with separate legs extending on opposite sides of said injector opening, one of said legs connecting with the two exhaust ports to the rear of said cylinder location and the other of said legs connecting with the two exhaust ports to the front of each cylinder location, one of the ports connecting with each leg comprising an inner port disposed at the end of its respective exhaust leg and the other of said ports comprising an outer port disposed closer to the side wall outlet of its exhaust passage than said inner port, a plurality of exhaust valves reciprocably carried in said cylinder head and closing said exhaust ports, said valves being openable to permit exhaust flow from said cylinders to said exhaust passages, a plurality of valve bridges carried on said head and arranged one for each pair of valves connecting with a common exhaust passage leg, said bridges engaging the ends of their respective valves, a plurality of injectors, one for each cylinder location and received in the respective injector openings of said head, said injectors each having a body portion including a thickened outer part intermediate the outer valves of each cylinder location, a plurality of rocker arms for each cylinder location, including a centered rocker arm engaging said injector and a pair of rocker arms, one on either side of said centered rocker arm and each engaging one of said valve bridges for actuating said valves, a rocker arm shaft for each cylinder location and supporting said rocker arms, a pair of shaft supports for each rocker arm shaft, said shaft supports being secured to said cylinder head and extending beside the locations of the inner valves of their respective cylinder locations, said exhaust ports and their respective valves being arranged in trapezoidal fashion with the inner and outer valves being laterally equally spaced form the axis of said cylinder and injector tube but with the inner ports and valves being longitudinally spaced closer to the axis of said cylinder and injector tube than are the outer ports and valves whereby the inner valves avoid interference with said rocker arm supports and the outer valves avoid interference with said injector body thickened portion while providing a substantial coolant passage between said exhaust ports and said injector receiving wall for coolant flow therebetween.

* * * * *